INVENTOR:
Ernest Wildhaber

Aug. 1, 1967  E. WILDHABER  3,333,482
GEAR DRIVE WITH PLURALITY OF EQUAL GEARS CONNECTING
COAXIAL DRIVE AND DRIVEN GEARS
Filed March 11, 1965  2 Sheets-Sheet 2

INVENTOR:
Ernest Wildhaber

United States Patent Office 3,333,482
Patented Aug. 1, 1967

3,333,482
GEAR DRIVE WITH PLURALITY OF EQUAL GEARS CONNECTING COAXIAL DRIVE AND DRIVEN GEARS
Ernest Wildhaber, Brighton, N.Y.
(124 Summit Drive, Rochester, N.Y. 14620)
Filed Mar. 11, 1965, Ser. No. 438,839
14 Claims. (Cl. 74—421)

The present invention relates to gear drives, and particularly to drives containing an internal gear, an external gear coaxial therewith, and a plurality of intermediate gears each meshing with both coaxial gears.

One main object of the invention is to provide structure insuring not only equal loads on the several intermediate gears, but also a tooth load centered close to the tooth middle regardless of deflections occurring increasingly with increasing load and in spite of small inaccuracies of the teeth that occur even with careful manufacture.

Tooth crowning is commonly used to keep the tooth bearing within the boundaries of the teeth. This means shortening the tooth bearing deliberately. A further object is to so mount an intermediate gear meshing with two other gears that no crowning or little of it is required, thereby to obtain longer tooth bearings and stronger and quieter teeth.

Another aim is to provide an improvement over the structure using helical gears described in my application Ser. No. 175,667, filed Feb. 26, 1962, now Patent No. 3,178,966, granted Apr. 20, 1965.

Other objects will appear in the course of the specification and in the recital of the appended claims.

Figure 13:
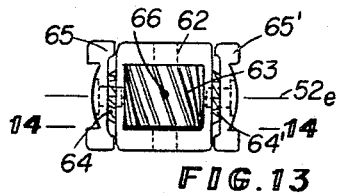
Figure 14:
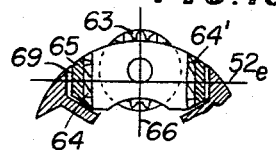
Figure 15:
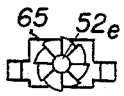

FIGS. 13 to 15 illustrate one form of holder shaped for self adjustment, the holder mounting a helical intermediate gear. FIG. 13 is a plan view, FIG. 14 a corresponding front elevation taken along the axis of the gear, while FIG. 15 is a side view showing sliding block 65. Two adjustments are provided, tilt about an axis 66 and helical displacement about an axis $52_a$.

Figure 16:
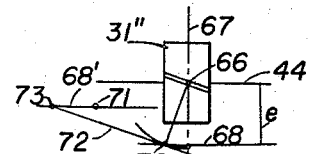
Figure 17:

FIGS. 16 and 17 are corresponding diagrams for determining surface directions on a holder capable of making both adjustments without added parts.

Figure 18:
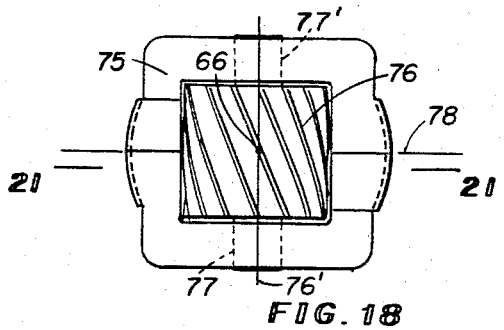
Figure 19:
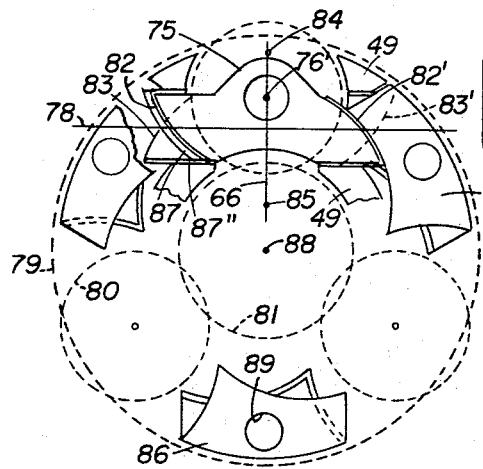
Figure 20:
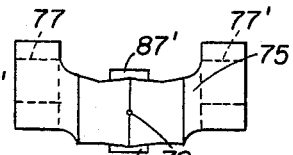
Figure 21:
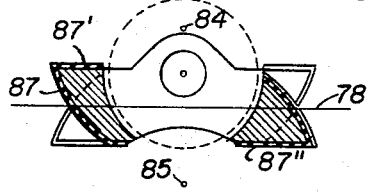

FIGS. 18 to 21 illustrate a preferred form of holder for helical intermediate gears, a holder that can adjust itself helically and angularly about two different axes by direct contact, without added parts. FIG. 18 is a plain view; FIG. 19 a view of the holder and adjacent parts taken along the axis of the gear it mounts, while FIG. 20 is a side view. FIG. 21 is a section of the holder taken along lines 21—21 of FIG. 18.

Figure 22:
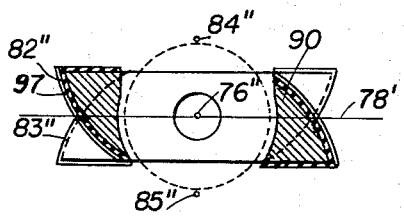

FIG. 22 is a similar section of a slightly modified holder.

Figure 23:
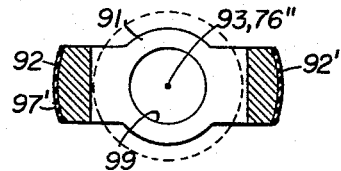
Figure 24:
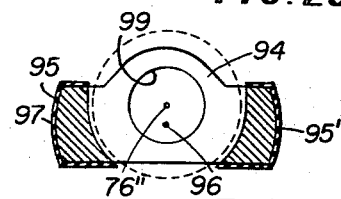

FIGS. 23 and 24 are cross-sections of modified holders taken at right angles to the axis of the gear they mount.

Figure 1:
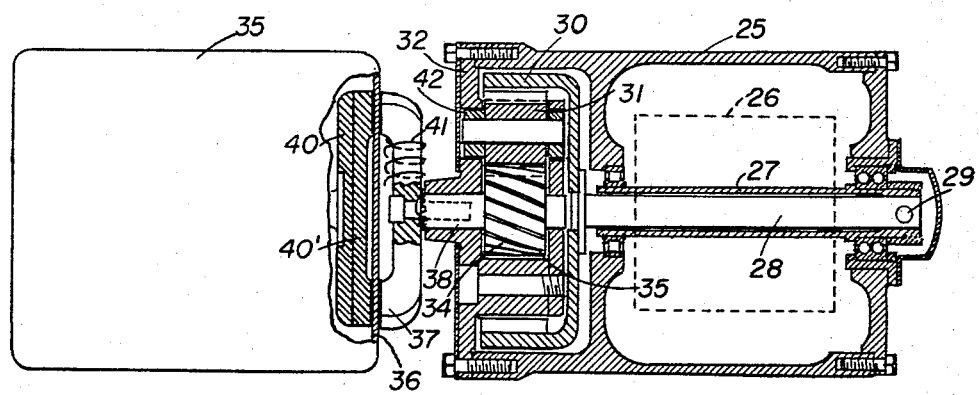
FIG. 1 is an axial section of a gear drive embodying the present invention, wherein the intermediate gears are carried by a stationary member or element.
Figure 2:
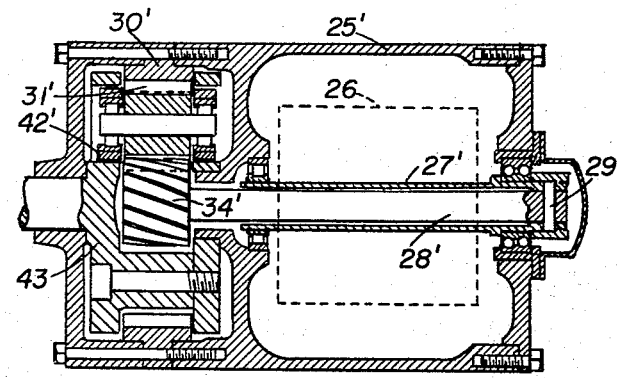
FIG. 2 is an axial section showing a modification, wherein the element carrying the intermediate gears revolves, while the internal gear is stationary.

Housings 25, 25', FIGS. 1 and 2, hold an electric motor whose rotor is diagrammatically indicated at 26. It has a hollow spindle 27, 27' respectively. Shafts 28, 28', respectively, extend through said hollow spindles and carry gears 30, 34' respectively, at one end. The shafts 28, 28' are secured to their respective hollow spindles at the opposite ends thereof in a way to transmit axial thrust as well as torque. The axial thrust is caused by the gears 30, 34' having helical teeth, or broadly teeth inclined to the direction of their axes. Each shaft (28, 28') is without support between said gear (30, 34', respectively) and its opposite end, to let the gear adjust itself to the several intermediate gears it meshes with so that it transmits approximately equal loads to them.

Ordinarily a long shaft requirees about an equal length of extra space, so that the bulk of the gear drive is increased. Here no extra space is needed, as the driving shaft is inside the hollow motor-spindle. Novelty resides also in the attachment of the driving shaft to the hollow spindle such that axial thrust is transmitted by the helical gear at the end of the shaft. The attachment shown is with a pin 29 that extends through the hollow spindle and through the shaft.

FIG. 1 illustrates a speed-up drive. Shaft 28 is rigid with an internal gear 30 that meshes with a plurality of intermediate gears or idlers 31. These are carried by a stationary member 32 which is an end cover of housing 25. The intermediate gears 31 drive a central gear or pinion 34 that is coaxial with gear 30 and has helical teeth 35. Each intermediate gear meshes with both coaxial gears 30, 34 so that they as well as the intermediate gears also have helical teeth.

Gear 34 drives a power consumer requiring hermetic sealing, diagrammatically indicated at 35. It may be a refrigeration unit. Rather than enclosing also the motor and gear drive within the hermetically sealed housing, I may enclose only the unit 35 itself, leaving the motor and gear drive in the open and of easy access. Such disposition may cut the motor cost about in half.

Figure 9:
FIG. 9 is an axial view of part 37 of FIG. 1, taken from the left.
Figure 10:
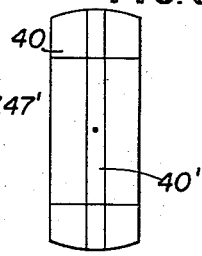
FIG. 10 is an axial view of part 40 of FIG. 1, taken from the right.

To drive through the sealed housing 36, a magnet 37 is rigidly secured to the shaft 38 that is integral with gear 34. It forms a magnetic circuit with a magnetizeable part 40 on the inside of housing 36. Part 40 is rotatable coaxially with shaft 38. Front views of magnet 37 and of part 40 are afforded by FIGS. 9 and 10. Either a permanent magnet 37 may be used, or for larger sizes preferably an electromagnet, as diagrammatically indicated by coil 41. The slip rings and contact brushes used with an electromagnet are omitted in diagrammatic FIG. 1. A permanent magnet portion 40' may be used in part 40, which otherwise is of ferrous material that is easily magnetized and demagnetized.

Each intermediate gear 31 or idler is rotatably mounted in a holder 42 to be further described hereafter. The holder permits slight compound adjustment with respect to element 32 that carries it, to enable its gear 31 to line up its teeth to suit the mating teeth in both meshes.

The embodiment of FIG. 2 is a planetary reduction drive. Here the driving shaft 28' is formed integral with a sungear or pinion 34' having helical teeth. It meshes with a plurality of intermediate gears or planets 31'. These mesh with a stationary internal gear 30' rigid with housing 25'. Each gear 31' meshes with both coaxial gears 30', 34', and is rotatably mounted in a holder 42'. The holder can adjust itself slightly to suit both meshes. The planet carrier 43 is the driven member.

Figure 3:
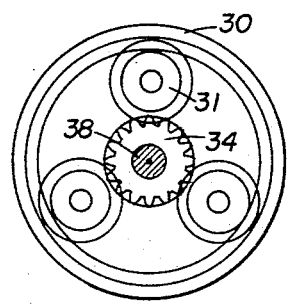
FIG. 3 is an axial view showing the disposition of the gear bodies in both FIGURES 1 and 2.

The gear arrangement is the same as in FIG. 1, as illustrated in FIG. 3. Preferably I keep the tooth number of gear 34 or 34' prime to three when three intermediate gears 31 or 31' are provided. Gear 34 is shown with 16 teeth. This staggers the contact of this gear with the three intermediate gears and makes the mesh conditions more uniform.

Adjustment for tooth bearing

Figure 4:
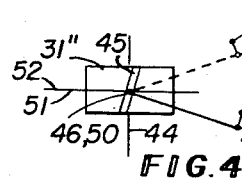
FIGS. 4 to 8 are diagrams explanatory of the principles underlying the adjustment of the intermediate gears or idlers.
Figures 6, 7, 8:
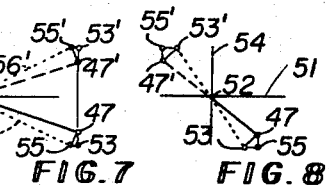
Figure 5:
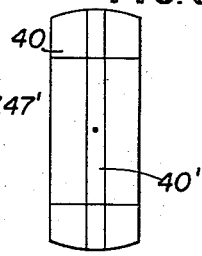

Diagrams FIGS. 4 to 6 show an intermediate gear or idler 31'' in a view at right angles to its axis 44, in a view along its axis and in a side view respectively. The direction of its helical teeth is indicated at 45 in FIG. 4. 46, 46' are the mean points of mesh in the two mesh regions, and 46–47, 46'–47' are the tooth surface normals of the tooth sides that are simultaneously under load.

Adjustment of gear 31'' about an axis 50 may move points 47, 47' to positions 48, 48' and thereby increase the inclination of the projected normal (FIG. 4) to the central plane 51 in one mesh region while decreasing it in the opposite mesh region.

Adjustment of gear 31'' about an axis 52 is referred to in FIGS. 7 and 8. As we are interested only in angular displacements we let the normals 46–47, 46'–47' intersect axis 52 in FIGS. 7 and 8. FIG. 7 is a view taken in the same direction as FIG. 4, while FIG. 8 is a view along axis 52. Displacement about axis 52 may move points 47, 47' to positions 53, 53' respectively, (FIG. 8). In these positions the inclination of the normals to plane 54 has been decreased. Plane 54 is parallel to the planes tangent at 46, 46' to the gear pitch surface. A simple turning moment about the gear axis restores this inclination. Points 53, 53' then move to positions 55, 55'. The normals 56, 56' (FIG. 7) to points 55, 55' have both an increased inclination to central plane 51. At opposite turning direction about axis 52 they have both a decreased inclination.

By combining adjustments about axes 50 and 52 any two different inclinations of the normals 46–47, 46'–47' (FIG. 4) can be attained, so that the tooth direction in the center of the teeth is matched in both meshes.

The slight combined adjustment is made a self adjustment by a disposition such that equilibrium exists only when the tooth contact is centered at the tooth middle in both meshes, while keeping friction that resists adjustment to a minimum.

In this respect there is a difficulty with the adjustment about axis 52: The axial tooth-load components at points 46, 46' (FIG. 6) are opposite and tend to tilt the helical gear 31''. I have discovered that equilibrium can be restored with an added displacement in the direction of tilt axis 52 accompanying the tilt. In other words, instead of using a simple tilt a helical tilt is used. The lead of the helical tilt is such that at the points 46, 46' the adjusting displacement is in the lengthwise direction of the teeth. This defines the helical lead. The hand of the helical tilt is opposite to the hand of the helical gear teeth. Thus right hand gear teeth call for a left hand helical tilting adjustment.

Also I have found that the axis of the helical tilt may be offset from the gear axis 44 without ill effect. Axis 52$_e$ (FIG. 5) is such an offset axis. The lead of the helical adjustment is computed as if for intersecting axes.

Friction

Friction that resists adjustment may be kept down by such solid lubricants as graphite or layers of Teflon, but I prefer to use layers of elastic yielding material that resembles rubber, natural or artificial, as part of my invention. At the very small displacements used here it can operate practically without friction.

Figure 11:
FIGS. 11 and 12 are diagrams explanatory of a preferred way of minimizing friction in the self adjustment provided.
Figure 12:

Diagrams FIGS. 11 and 12 show the underlying principle. The surfaces 58, 59 contact through a layer 60 of rubber-like material. If the surfaces are ample, a large pressure can be exerted between the surfaces 58, 59 without much change in the thickness of the layer 60. However it takes very little force to displace surface 59 sidewise very slightly from the position of equilibrium.

Lines 61 have been marked on layer 60 in the position of equilibrium, FIG. 11. They become inclined lines 61' (FIG. 12) upon lateral displacement of surface 59. The force resisting such displacement is approximately proportional to the inclination of the lines 61' to their original direction. Very close to the position of equilibrium (FIG. 11) the inclination is very small and the resisting force is likewise very small. So there is very little resistance or friction opposing the very small displacements required. Preferably the layer 60 is bonded to one of the surfaces 58, 59.

Holders

FIGS. 13 to 15 illustrate one form of holder for an intermediate helical gear. Holder 62 extends in a closed circuit about the helical gear 63 and contains a pair of spaced bearings therefor. It has a pair of couplings 64, 64' in line with the axis 52$_e$ of helical adjustment. The couplings look like sawtooth clutches or starter jaws. Their teeth have helical sides of the computed lead. They match counterpart helical surfaces provided on a pair of blocks or shoes 65, 65' that are slightly movable about an axis 66. Axis 66 passes through the diametrically opposite zones of mesh of gear 63 and intersects the gear axis at right angles. Axis 52$_e$ is offset from the gear axis and intersects axis 66 at right angles. A layer 69 of rubber-like material backs up the shoes 65, 65'.

In a preferred embodiment I do away with these shoes and shape the outside of the holder so that it can directly adjust itself angularly about axis 66 and helically about another axis with respect to the element that carries it.

A way of determining such a shape will now be described with FIGS. 16 and 17. For convenience we let the axis 67 of helical adjustment intersect the gear axis 44. It should be understood, however, that the helical lead so determined and the shape applies equally when the axis of helical adujstment is offset from the gear axis.

We consider a plane 68 perpendicular to axis 67 at a distance $e$ from the gear axis, and a point 70 in this plane. Point 70 has a radial distance $r$ from axis 67, at an angle $u$ from the direction of axis 66.

Our first step is to determine a plane through point 70 that is both a tangent plane to a surface of revolution with axis 66 and a tangent plane to a helical surface with axis 67. The lead angle $h'$ of the helical surface, at point 70, depends on the helix angle $h$ of the gear teeth at pitch radius or mean radius $R$ as follows:

$$\tan h' = \frac{R}{r} \tan h$$

We now consider a plane 68' parallel to plane 68 and at a unit distance therefrom (distance=$l$). The helix tangent at point 70 (FIG. 17) intersects this plane at 71, at a distance $\operatorname{ctnh'}$ from point 70 projected to said plane.

In FIG. 16 point 70 appears at a projected distance $r \cdot \sin u$ from axis 67. The tangent 72 at 70 to the circle about axis 66 intersects plane 68' at 73. In FIG. 17 point 73 appears at a distance $$70\text{–}73 = \frac{e}{r \cdot \sin u}$$

from projected point 70. It is seen that 71–73, FIG. 17, is the trace of the sought tangent plane in plane 68'. The tangent plane itself contains trace 71–73 and the actual point 70. Its inclination to the drawing plane of FIG. 17 is readily determined from the known inclination $h'$ of the helix tangent at 70. The normal or perpendicular 70–74 to said tangent plane at point 70 appears perpendicular to trace 71–73 and intersects axis 66 at point 74.

The same conditions exist at diametrically opposite point 70' (FIG. 17), whose normal intersects axis 66 at 74', at the same distance from axis 67 as point 74.

Trace 71–73 (FIG. 17) is found to be parallel to radius $r$ when $(70\text{–}73) \cdot \cos u = (70\text{–}71)$.

This can be transformed into $$\tan u = \frac{e}{r} \tan h'$$

for this special case.

In an important embodiment of the invention the holder contains spherical surface portions on its outside that pass through points 70, 70' respectively and are centered at 74 and 74' respectively. The mating portions on the element that carries the holder are parts of helical surfaces of constant lead, such as are enveloped or generated by a spherical surface centered at 74 or 74' moving helically about axis 67 as if it were helically adjusted. In view of the small helical adjustment required very little helical generation is needed, so that the mating surfaces nearly follow each other completely.

The spherical surfaces permit angular adjustment about the axis 66 connecting the sphere centers. And the helical mating surfaces permit the required helical adjustment about axis 67.

Preferably a layer of rubber-like elastic deformable material is bonded to said spherical surfaces, so that the holder contacts said element through said layer. The principal function of the layer is to provide the small adjustment with a minimum of opposition or friction. It further has some dampening effect on vibrations and noise.

FIGS. 18 to 21 illustrate a holder 75 such as preferably used in the gear drives illustrated in FIGS. 1 to 3. A helical gear 76 is rotatably mounted in holder 75 on spaced bearings 77, 77'. Holder 75 may angularly adjust itself about an axis 66 and helically about an axis 78 that is offset from the gear axis 76'. The offset is for design reasons in a drive with an internal gear. The inside circle 79 of the internal gear, and the outside circles 80, 81 of the intermediate gears and the external gear respectively are indicated in dotted lines in FIG. 19. While gear 76 is shown mounted on plain bearings, antifriction bearings may also be used. Holder 75 extends in a closed circuit around gear 76 and has outer spherical surface portions 82, 83 adjacent one end lengthwise of axis 78 and 82', 83' adjacent the opposite end.

Portions 82, 83' are centered at 84 on axis 66, while portions 83, 82' are centered at 85 on axis 66. The adjacent spherical surfaces, such as 82, 83, are on opposite sides of a mid-plane that contains axis 78 and is perpendicular to the gear axis. The element 49 that carries the holders 75 (element 32 of FIG. 1 and element 43 of FIG. 3) is made up of several parts that are rigidly connected and are formed to permit ready assembly. It contains parts 86 that have the said helical surface portions for contacting the spherical portions of the holders 75 through a rubber-like layer 87. After the holders are equally spaced about axis 88 the parts 86 can be assembled radially in a direction towards axis 88 into contact with the holders. Then the main body of element 49 can be set in along axis 88. This body, a cover, and the parts 86 are then rigidly bolted together in obvious manner. The parts 86 have bolt holes 89 for this purpose.

The layer 87 is preferably held thin, within a tenth of the sphere radius of the portions 82, 83. It is not confined to the spherical portions, but covers also other contact portions, as shown at 87', 87" in FIGS. 20 and 21.

Equilibrium exists only when the tooth load is centered at the tooth middle in both meshes of each intermediate gear. The holder seeks its position of equilibrium and keeps the average tooth load centered where it should be.

FIG. 22 illustrates a holder 90 in a section like section 21—21 of FIG. 18, where however the helical adjustment axis 78' intersects the gear axis 76'. This is feasible when the said internal gear is quite large or when an external gear is substituted therefor. The sphere centers are at 84", 85".

FIG. 23 is a cross-section of a holder 91 having outer surface portions 92, 92' that lie in a single spherical surface. The spherical surface is centered at 93 on the gear axis 76". Such a configuration is suited for a holder that mounts a spur gear with straight teeth.

FIG. 24 illustrates another form of holder 94 for mounting a spur gear. The outer surface portions 95, 95' also lie in a single spherical surface. But its center 96 is offset from the gear axis 76". Its rubber-like layer 97 covers the spherical surface portions and also the upper and lower end portions of the holder. The layer at the end portions should always be so applied as to permit the intended adjustment. In FIG. 23 the layer 97' only needs to cover the spherical portion if the gear axis is stationary.

In all cases the layer is preferably bonded to the holder, and the gear in the holder is mounted on a pair of spaced bearings. Hole 99 in FIGS. 23 and 24 is to hold one of the two bearings, while an opposite hole holds the other.

More broadly the holder contains an outer portion which is part of a surface of revolution centered in or near the mid-plane of the gear (51 in FIG. 4) on an axis (50, FIG. 5) that intersects the gear axis at right angles. And this portion contains a rubber-like layer bonded to it, for contacting the carrier element through said layer.

While the invention has been described with several different embodiments thereof, it will be understood that it is capable of further modification; and this application is intended to cover any variations, uses, or adaptations of the invention following, in general, the principle of the invention and including such departures from the present disclosure as come within known or customary practice in the art to which the invention pertains, and as may be applied to the essential features hereinbefore set forth, and as fall within the scope of the invention or the limits of the appended claims.

I claim:

1. A gear drive for transmitting power between a motor and a power consumer requiring hermetic sealing, said motor having a hollow spindle, comprising a shaft extending through said hollow spindle, an internal gear rigid with said shaft and disposed at one end thereof, said shaft being connected to said spindle at its opposite end and being without support between said connection and said internal gear, an external gear coaxial with said internal gear, a stationary member, and a plurality of angularly-spaced, intermediate gears rotatably mounted in said stationary member, each meshing with both said coaxial gears to share the load transmitted between said coaxial gears, a power consumer containing a rotary element, a hermetically sealed housing surrounding only said power consumer, and a magnet connected with said external gear, said magnet forming a magnetic circuit with a magnetized part rigid with said element, to transmit motion through said housing.

2. A gear drive for use with an electric motor having a hollow spindle, comprising a shaft extending through said hollow spindle, an internal gear rigid with said shaft and disposed at one end thereof, said shaft being connected with said spindle at its opposite end and being without support between said connection and said internal gear, a driven member rigid with an external gear that is coaxial with said internal gear, and a plurality of intermediate gears each meshing with both said coaxial gears, said intermediate gears being carried by a stationary element.

3. A gear drive for use with an electric motor having a hollow spindle, comprising a shaft extending through said hollow spindle, a gear rigid with said shaft and disposed at one end thereof, said gear having teeth inclined to the direction of its axis, said shaft being connected with said spindle at its opposite end and being without support between said connection and said gear so that said gear may adjust itself radially by flexing said shaft, said shaft connection including positive means for holding said shaft in axial direction to transmit the axial thrust of said gear to said motor, another gear coaxial with the first-named gear, one of said coaxial gears being an internal gear, a plurality of intermediate gears each meshing with both said coaxial gears to share the load transmitted between said coaxial gears, an element on which said intermediate gears are rotatably carried, another element rigid with said internal gear, and means for maintaining one of said two elements stationary.

4. A gear drive comprising an internal gear, an external gear smaller than said internal gear and coaxial therewith, a plurality of intermediate gears each meshing with both said coaxial gears to share the load transmitted between the coaxial gears, a first element rotatably carrying said intermediate gears, another element rigid with said internal gear, a third element rigid with said external gear, means for driving one of said elements, means for maintaining one of said elements stationary, the remaining element being the driven member, means permitting self-adjustment of one of said coaxial gears to center it on said plurality of intermediate gears, a holder for each of said intermediate gears, each of said intermediate gears being mounted on a pair of spaced bearings in its holder, each holder surrounding its gear and having limited angular adjustment freedom on said first element to change the position of the axis of its intermediate gear in any angular direction.

5. A gear drive comprising an internal gear, an external gear smaller than said internal gear and coaxial therewith, a plurality of intermediate gears each meshing with both said coaxial gears, a first element rotatably carrying said intermediate gears, another element rigid with said internal gear, a third element rigid with said external gear, means for driving one of said elements, means for maintaining one of said elements stationary, the remaining element being the driven member, means permitting self adjustment of one of said coaxial gears to center it on said plurality of intermediate gears, each of said intermediate gears being mounted on a pair of spaced bearings in a holder, said holder having limited angular adjusement freedom on said first element, and said holder contacting said first element through a layer of rubber-like material.

6. In a gear drive, a holder, a gear rotatably mounted on said holder on a pair of spaced bearings, an element that carries said holder, and means permitting adjustment of said holder on said element about an axis intersecting the gear axis at right angles and helically about and along another axis extending in a direction at right angles to the gear axis, so that rotary displacement about the second axis causes simultaneously axial displacement along said second axis.

7. In a gear drive, according to claim 6, wherein the axis of helical adjustment of said holder is offset from the gear axis.

8. In a gear drive, a holder, a gear rotatably mounted on said holder on two spaced bearings, said holder having a plurality of outer surface portions adapted to contact a helical surface whose axis extends in a direction at right angles to the rotary axis of said gear so that rotary displacement of said holder about said axis causes simultaneous displacement of said holder along said axis.

9. In a gear drive according to claim 8, wherein said outer surface portions are parts of spherical surfaces.

10. In a gear drive, a holder in which a gear is rotatably mounted in two spaced bearings, an element that carries said holder, said holder having outer surface portions each of which is part of a surface of revolution centered approximately in the mid-plane of the gear, a rubber-like layer extending along said portions, and portions provided on said element to contact said portions of the holder through said layer.

11. In a gear drive, a holder according to claim 10, wherein said layer is bonded to said holder.

12. In a gear drive, a holder in which a gear is rotatably mounted on two spaced bearings, an element that carries said holder, said holder having an outer spherical surface portion, and a layer of rubber-like material interposed between said surface portion and a mating surface portion provided on said element, to effect contact through said layer.

13. In a gear drive, a holder according to claim 12, wherein the holder extends in a closed circuit about the gear it mounts, wherein the center of said spherical portion is offset from the gear axis, and wherein said layer is bonded to the holder.

14. In a gear drive having a plurality of equal helical gears spaced about an external gear and meshing with said external gear and with an internal gear coaxial therewith, a holder for rotatably mounting each helical gear, each holder having outer surface portions engaging a common member, said portions lying on a pair of opposite surfaces of revolution centered on an axis that is radial of said external gear and that intersects the axis of its helical gear, the outer surface portions in planes perpendicular to the axis of the associated helical gear lying on opposite surfaces of revolution while diagonally opposite outer surface portions lie in the same surface of revolution.

References Cited

UNITED STATES PATENTS

| | | | |
|---|---|---|---|
| 650,837 | 6/1900 | Heath | 74—801 X |
| 1,849,596 | 3/1932 | Short | 74—410 |
| 2,408,336 | 9/1946 | Orr. | |
| 2,591,734 | 4/1952 | Smith et al. | 74—801 |
| 3,080,775 | 3/1963 | Fritsch | 74—801 |
| 3,085,407 | 4/1963 | Tomlinson | 64—6 |
| 3,090,258 | 5/1963 | Zink et al. | 74—410 X |
| 3,257,869 | 6/1966 | Sharples | 74—801 |

ROBERT M. WALKER, *Primary Examiner.*

DAVID J. WILLIAMOWSKY, *Examiner.*

L. H. GERIN, *Assistant Examiner.*